United States Patent Office 3,624,865
Patented Dec. 7, 1971

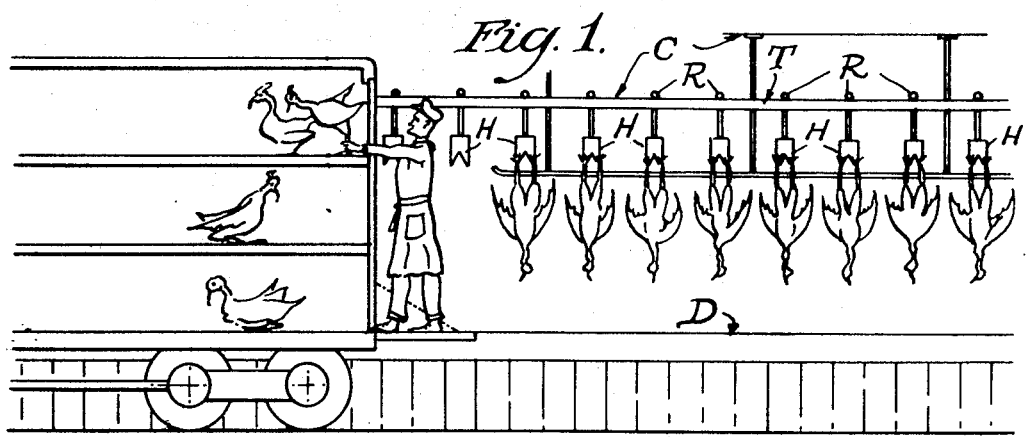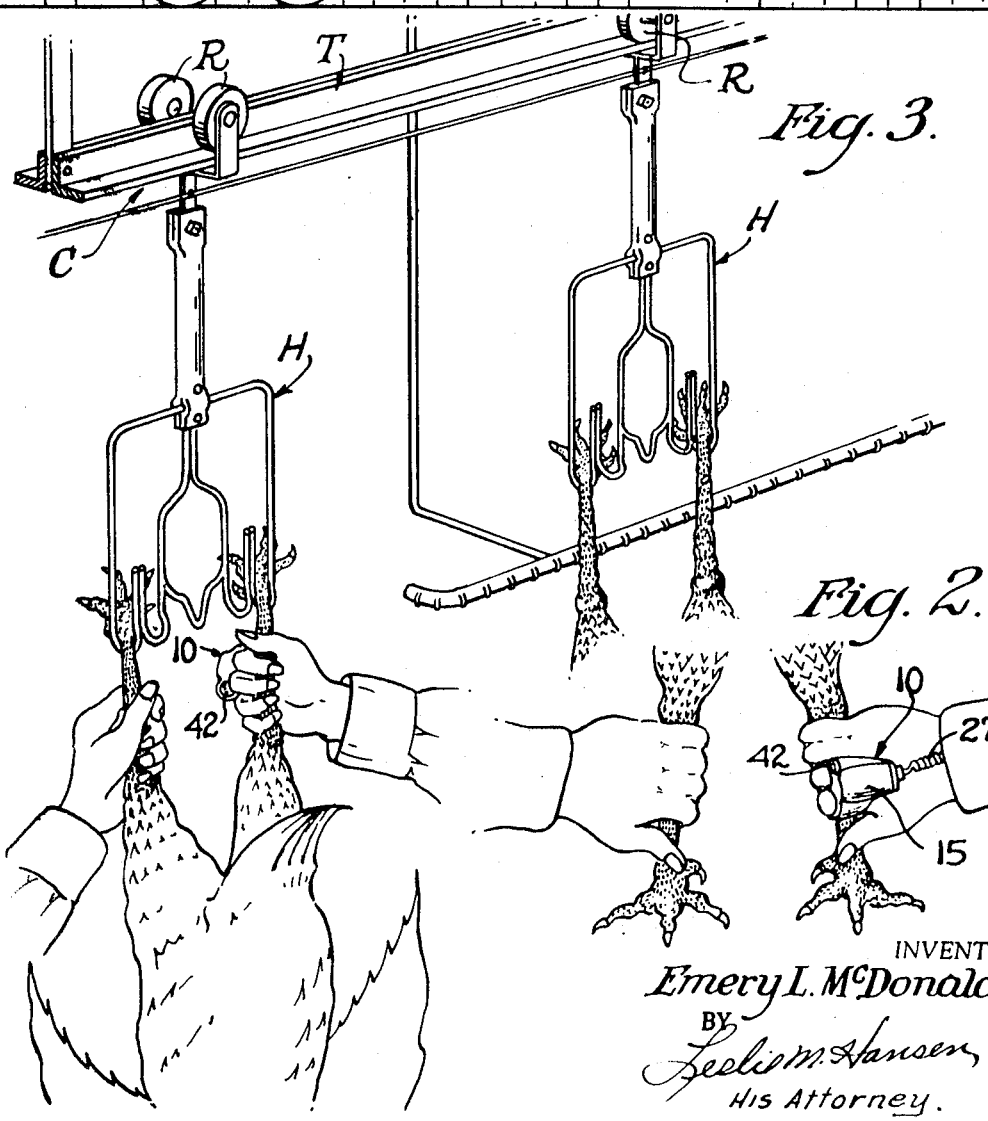

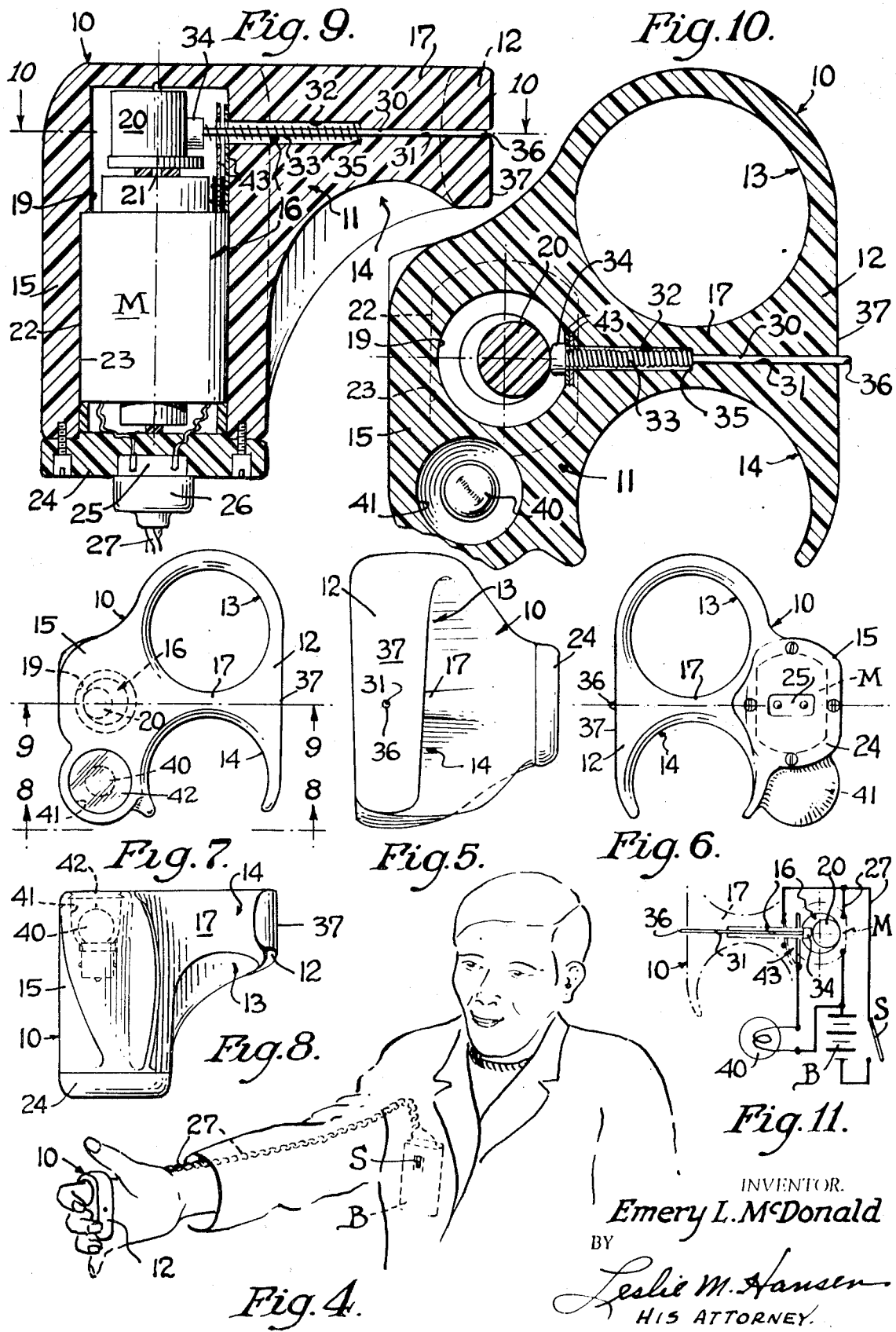

3,624,865
HAND TYPE APPARATUS FOR QUIETING POULTRY DURING HANDLING THEREOF
Emery L. McDonald, 10395 Wunderlich Drive, Cupertino, Calif.
Filed Mar. 31, 1970, Ser. No. 24,272
Int. Cl. A22b 3/08; A22c 21/00
U.S. Cl. 17—11                                        9 Claims

ABSTRACT OF THE DISCLOSURE

For pacifying birds into a state of calm during handling thereof from coop or yard to conveyance and from the latter to hangers incident to slaughter, a hand worn finger ring vibrator having a leg engaging palm plate for transmitting vibrations from the apparatus to the leg of a bird gripped by a hand wearing such apparatus and including visual means for exciting the curiosity of such birds for lulling them into a state of tranquility to thereby minimize undue excitement and wing flapping and resulting injury and bruising to the birds as well as the handler wearing such apparatus.

BACKGROUND

This invention relates to apparatus for quieting domestic birds such as chickens, turkeys, geese and ducks in the course of handling the same. The invention embraces the principle of subjecting the leg or legs of a bird to periodic sensations while grasping the legs and holding the bird in an inverted suspended position. The principle and purpose is fully explained in my co-pending application Ser. No. 710,066 filed Mar. 4, 1968 entitled Apparatus for Quieting Poultry Incident to Preparation for Marketing which issued as Pat. No. 3,507,002 dated Apr. 21, 1970.

In the above entitled patent the apparatus is embodied in a conveyor system in which the birds are suspended by their legs from an overhead track. In that case the legs of the bird have wiping engagement with an element inducing a variance of sensations into the legs of the birds as they are moved along by the conveyor.

THE PRESENT INVENTION

Although this invention involves the same principle and its effect upon the birds, it has its application and embodiment in an instrumentality for use in a person's hand. As explained in my aforementioned patent in the handling of birds, especially turkeys, the handlers twist their wrists, palm out, while grasping the legs of a bird. Then by a twist of the wrists they automatically turn the bird upside down incident to hanging them by their feet on the conveyor system.

The birds, turkeys especially, instinctively resist this handling by flapping their wings in an effort to free themselves. Such wing flapping not only injures the birds themselves but adjacent birds as well as the handler attempting to transfer the birds from one closure to another and to a conveyor system in a slaughter house.

It is an object of the present invention to provide a simple yet effective finger ring type apparatus to be worn by such handler with a palm plate having a bird leg engaging face and means on the apparatus for creating vibratory sensations through such palm plate and to the bird legs grasped by the handler.

It is another object to provide in such an apparatus a motivating means for vibrating the palm plate. In this connection it is a further object to provide such motivating means in the form of an electric motor carried by the finger ring type apparatus and a switch operated power supply therefor carried by the handler remotely from the apparatus.

It is a further object to provide such motivating means with a rotary type eccentric. This object further entails transmission of physical impulses to the leg of a bird engaged by the palm plate.

It is a still further object to provide a spring loaded plunger between the eccentric and palm plate with a tip for periodically tapping against a bird leg engaged by the palm plate.

Yet another object is to provide a visual alarm or means on the hand type quieter for exciting the curiosity of the birds to render them quiescent. This visual alarm is preferably a flashing lamp automatically controlled from the eccentric for exciting the curiosity of the birds prior to gripping of their legs as well as during the gripping thereof.

These and other objects and advantages of the present invention will become apparent from a reading of the following description in the light of the two sheets of accompanying drawing in which:

FIG. 1 is a pictorial illustration of a truck being unloaded at a receiving station of a poultry handling conveyor;

FIG. 2 is a fragmentary illustration of the manner of grasping the legs of a bird and subjecting them to the hand type quieter of the present invention;

FIG. 3 is a fragmentary perspective view of the receiving end of the conveyor of FIG. 1 illustrating the manner of hanging the birds on the conveyor while subjected to the effect of the hand type quieter;

FIG. 4 is a pictorial illustration of the hand type quieter of the present invention as worn by a person;

FIG. 5 is an end view of the hand type quieter of FIGS. 2, 3 and 4 as seen from the open end thereof in FIG. 4;

FIG. 6 is an elevational view of the palm side and turkey leg engaging element of FIG. 5 and as seen from the right hand side thereof;

FIG. 7 is an elevational view of the back end of the hand type quieter as seen from the righthand side of FIG. 6;

FIG. 8 is an elevational view looking upwardly toward FIG. 5 above;

FIG. 9 is an enlarged section through the hand type quieter of FIG. 7 taken along line 7—7 therein and turned 180 degrees relative thereto;

FIG. 10 is a section through FIG. 9 taken along line 10—10 therein; and

FIG. 11 is a schematic diagram of an electrical circuit for the hand type quieter.

GENERAL DESCRIPTION

Referring to the drawings, FIG. 1 shows a receiving dock D at the slaughterhouse wherein an overhead conveyor C has a plurality of hangers H suspended from rollers R guided on a track T which extends into the processing part of the building (not shown). The birds are shipped by truck to the receiving dock D where the men take the birds from their cages and hang the birds, upside down on the hangers H of the conveyor C. As best illustrated in FIG. 2, the workmen turn their wrists palm out and grasp the legs of the birds by hand with thumbs down. Then with the legs firmly gripped, the birds are drawn free of the cage and by a twist of the wrists the workmen invert the birds with legs up. The feet of the birds are then inserted into yoke-like tines of the hanger H as illustrated in FIG. 3 whereupon the birds hang upside down for conveyance into the processing room of the slaughterhouse.

While handling the birds in the foregoing fashion they often will resist and start flailing their wings causing injury to the handler as well as bruising of the body of the bird itself. In accordance with the present invention means for pacifying the birds during handling is provided in a hand type quieter generally designated 10 in the drawings.

DETAILED DESCRIPTION

Referring to FIGS. 5 through 10 the hand type quieter 10 comprises a solid body 11 of non-conductive, non-corrosive material, preferably plastic molded in the form of a palm plate 12 having integral ring-like finger holes 13–14 and a casing 15 for a vibrator and the like of an alarm unit 16. The alarm unit 16 may be sensual by physical means which may be either audio, or visual means or both.

Referring to FIGS. 4 through 10 of the drawing the main body 11 of the hand type quieter 10 is preferably a monolithic structure in which the two finger holes 13 and 14 are spaced from each other by a divider web 17 whereby the palm plate 12 is disposed transversely of the fingers of a human hand inserted into and through the finger holes. The casing 15 is thus disposed back of the fingers and has a cavity 19 formed therein parallel to the wearer's fingers to receive the vibrator of the alarm unit 16. The vibrator is preferably of the rotary type having an eccentric 20 on a rotor shaft 21. Suitable means for rotating the shaft 21 may be a windup mechanism or an electric motor M as shown.

The motor M presently employed is a stock item available on the market for operating electrically motivated toys and the like empowered from a small dry cell battery B. Such motors M usually have at least one side 22 formed flat for holding the motor housing firmly in a mount provided. In this application the casing 15 has its cavity 19 provided with one flat side 23 to mount the motor M housing therein against rotation. A lid 24 at that end of the casing opposite the eccentric 20 affords access to the cavity for placing and replacing the motor in case of repairs.

The lid 24 has a receptacle 25 therein connected to the motor M by suitable electrical conductors and adapted to receive a plug 26 on one end of an electrical cord 27. The cord 27 has its opposite end connected to the battery B and controlled by a switch S in a conventional manner. The battery may be carried in a pocket of the handler's garment as shown in FIG. 4 and the cord 27 extended therefrom to the quieter 10 on the handler's fingers (see also FIG. 2). Upon closing of the switch S the motor M is energized to rotate the shaft 21 and eccentric 20 to thereby set up vibration in the main body 11 of the quieter 10. The vibrations are transmitted to the palm plate 12 which is pressed against the leg of a bird grasped by the hand of the handler wearing the quieter 10. This will afford a sensation to the leg of the bird thus gripped and render the bird passive.

Referring now to FIGS. 9, 10 and 11, the alarm unit 16 of the present invention includes means for physically applying sensations to the legs of a bird. This means includes a spring loaded plunger 30 mounted in the main body 11 of the quieter for reciprocation radially of the eccentric 20. The plunger 30 is mounted in a bore 31 formed through the divider web 17 between the finger holes 13 and 14. The bore 31 has an enlarged zone 32 for a compression spring 33 which circumscribes the plunger 30 between its head end 34 and a shoulder 35 formed in the bore.

By the foregoing arrangement the plunger 30 constantly has its head end 34 urged toward the eccentric 20. As best seen in FIG. 9 the plunger 30 is of a length such that its tip or bird leg engaging end 36 is normally retracted inside the leg engaging face 37 of the palm plate 12. At this stage the eccentric 20 on the rotary shaft 21 is diametrically opposite the bore 31. However, when the eccentric 20 rotates toward the bore 31 it presses the head 34 and plunger 30 axially outward to extend the tip end 36 of the plunger beyond the leg engaging face 37 of the palm plate 12 (FIG. 10). This reciprocating action of the plunger 30 occurs in timed relation to the rotation of the eccentric 20 thus causing the tip 36 to physically touch the leg of a bird repeatedly while it is grasped by the handler. This applies a sensation to the bird's leg which causes the bird to calm down and become quiet during handling of the bird.

As an added feature, and especially useful in the night time or in darkened areas a visual alarm is set up by a flashing light. To this end a small lamp bulb 40 is mounted in a second cavity 41 formed adjacent the cavity 19 in the main body 11 of the quieter 10. A lens 42 covers the lamp cavity 41 and may be of any color suitable to alarm a bird. The lamp bulb 40 is connected by suitable electrical conductor wires tapped into the circuit to the motor M (FIG. 11). A make and break switch 43 arranged in the cavity 19 (FIGS. 9 and 10) has its contact elements disposed for contact by the head end 34 of the plunger 30. The contact elements of the switch 43 are normally spread and adapted to close circuit upon reciprocation of the head end 34 of the plunger toward the palm plate by the eccentric 20. In this manner the lamp bulb 40 flashes on and off when switch S between the battery B and motor M is turned on. This flashing light is visually seen by the birds and excites their curiosity such as to render them quiet while the handler is seeking out bird legs to be grasped in the darkness.

From the foregoing it will be appreciated that the hand type quieter for poultry handlers affords a simple yet effective means for keeping birds such as turkeys in a quiet and passive state while the birds are being hand carried and transferred from a coop to a transport vehicle or from the latter to hanger conveyors in a slaughterhouse. The birds are thus kept from injuring themselves as well as the handler during the transfer operation.

While I have described the hand type quieter for poultry in specific detail it will be appreciated by those skilled in the art that the same may be varied, altered and/or modified without departing from the spirit of my invention therein.

What I claim as new and desire to protect by Letters Patent is:

1. A hand type apparatus for quieting poultry during the handling thereof comprising:
    (a) a main body having at least two finger holes formed therethrough;
    (b) a palm plate formed on said main body transverse to the axes of the finger holes thereof for engaging the leg of a bird gripped by the fingers of a handler wearing such main body; and
    (c) an alarm means mounted on said main body opposite said palm plate comprising:
        (1) a motor having a rotor shaft; and
        (2) an eccentric on the rotor shaft of said motor for vibrating said main body to thereby induce a sensual alarm transmittable to a bird engaged by said palm plate for quieting the bird during the handling thereof.

2. The hand type quieter in accordance with that of claim 1 in which said alarm means comprises:
    (a) an electric motor having a rotor shaft;
    (b) an eccentric on the rotor shaft; and
    (c) means between said eccentric and said palm plate for intermittently engaging the leg of a bird engaged by the latter for transmitting a sensual alarm to such bird for quieting the bird during handling thereof.

3. The hand type quieter in accordance with that of claim 2 in which said main body has a casing formed thereon; said casing having a cavity formed therein for supporting said electric motor with its rotor shaft substantially parallel to the axes of the finger holes formed in the main body, and a spring loaded plunger mounted for reciprocation in said main body radially of the eccentric on the rotor shaft of said motor for engaging one end of said plunger and for moving the opposite end thereof periodically into contact with the leg of a bird engaging said palm plate.

4. The hand type quieter in accordance with that of claim 3 including a web-like partition between the finger holes formed in said main body and having a bore formed therethrough from the cavity in said casing to the palm plate for supporting said spring loaded plunger for reciprocation as aforesaid.

5. The hand type quieter in accordance with that of claim 4 in which the bore formed through said web-like partition has an enlarged bore in the zone thereof adjacent the cavity in said casing to provide a shoulder in the bore between the ends thereof;
   a head on that end of said plunger within said cavity,
   a compression spring on said plunger between the shoulder in the bore and the head end of the plunger for urging the latter toward said eccentric, the plunger being of such a length as to be completely confined within the bore except when said eccentric is disposed on the palm plate side of the rotor shaft for extending said opposite end of the plunger beyond the leg engaging face of said palm plate.

6. A hand type quieter in accordance with that of claim 3 including:
   (a) a dry cell battery adapted to be carried on the person of the handler wearing such main body;
   (b) an electrical circuit between said dry cell battery and said motor; and
   (c) switch means in said electrical circuit for controlling the supply of electrical current from said dry cell battery to said motor.

7. A hand type quieter in accordance with that of claim 6 in which said alarm means includes means for visually attracting attention of a bird comprising:
   (a) an auxiliary cavity formed in said casing adjacent said first named cavity therein;
   (b) an electric lamp bulb mounted in the auxiliary cavity of said casing;
   (c) electrical conductor wires connecting said electric lamp bulb to said dry cell battery; and
   (d) a normally open switch means in said electrical conductor wires to said lamp bulb and disposed in said first named cavity between said eccentric and said plunger for periodically closing said normally open switch means in timed relation with the reciprocation of said plunger.

8. A hand type quieter in accordance with that of claim 5 including:
   (a) a dry cell battery adapted to be carried on the person of the handler wearing such main body;
   (b) an electrical circuit between said dry cell battery and said motor; and
   (c) switch means in said electrical circuit for controlling the supply of electrical current from said dry cell battery to said motor.

9. A hand type quieter in accordance with that of claim 8 in which said alarm means includes means for visually attracting attention of a bird comprising:
   (a) an auxiliary cavity formed in said casing adjacent said first named cavity therein;
   (b) an electric lamp bulb mounted in the auxiliary cavity of said casing;
   (c) electrical conductor wires connecting said electric lamp bulb to said dry cell battery; and
   (d) a normally open switch means in said electrical conductor wires to said lamp bulb and disposed in said first named cavity and engageable by the head end of said plunger for periodically closing said normally open switch means in timed relation with the reciprocation of said plunger.

References Cited
UNITED STATES PATENTS

| | | | |
|---|---|---|---|
| 765,926 | 7/1904 | Kelly | 272—27 R |
| 3,507,002 | 4/1970 | McDonald | 17—11 |
| 1,931,683 | 10/1933 | Weill | 272—27 N |
| 1,845,735 | 2/1932 | Adams | 272—27 N |
| 3,119,200 | 1/1964 | Curtin et al. | 46—232 |

SAMUEL KOREN, Primary Examiner

J. F. PITRELLI, Assistant Examiner

U.S. Cl. X.R.

119—97 R; 272—27 N